(12) United States Patent
Peters

(10) Patent No.: US 8,925,659 B2
(45) Date of Patent: Jan. 6, 2015

(54) ELECTRIC UTILITY VEHICLE

(75) Inventor: William F. Peters, Tulsa, OK (US)

(73) Assignee: Charles E. Wilson, League City, TX (US)

( * ) Notice: Subject to any disclaimer, the term of this patent is extended or adjusted under 35 U.S.C. 154(b) by 481 days.

(21) Appl. No.: 12/857,824

(22) Filed: Aug. 17, 2010

(65) Prior Publication Data

US 2010/0307844 A1  Dec. 9, 2010

Related U.S. Application Data

(63) Continuation-in-part of application No. 11/124,967, filed on May 9, 2005, now Pat. No. 7,866,422.

(60) Provisional application No. 60/569,387, filed on May 7, 2004.

(51) Int. Cl.
| | | |
|---|---|---|
| *B60K 7/00* | (2006.01) | |
| *B60L 8/00* | (2006.01) | |
| *B60L 15/20* | (2006.01) | |
| *B62D 31/00* | (2006.01) | |
| *B62D 47/00* | (2006.01) | |
| *A63B 55/08* | (2006.01) | |

(52) U.S. Cl.
CPC .............. *B60L 8/00* (2013.01); *B60L 15/2036* (2013.01); *B62D 31/003* (2013.01); *B62D 47/003* (2013.01); *A63B 55/087* (2013.01); *B60K 7/0007* (2013.01); *B60L 2220/22* (2013.01); *B60L 2260/28* (2013.01); *B60Y 2200/86* (2013.01); *Y02T 10/646* (2013.01); *Y02T 10/7083* (2013.01); *Y02T 10/648* (2013.01)
USPC .......................... 180/65.1; 180/65.51; 180/294

(58) Field of Classification Search
USPC ........... 180/65.1, 65.51, 65.8, 6.2, 6.24, 6.48, 180/6.5, 55, 58, 60, 291, 294, 298, 326, 180/334, 247; 280/775, DIG. 5
See application file for complete search history.

(56) References Cited

U.S. PATENT DOCUMENTS

| | | | |
|---|---|---|---|
| 2,245,789 A | | 6/1941 | Klavik |
| 2,436,153 A | * | 2/1948 | Sanmori ....................... 280/775 |

(Continued)

FOREIGN PATENT DOCUMENTS

JP          2005160289          6/2005

OTHER PUBLICATIONS

Tak, H. Y; International Search Report for International Patent Application No. PCT/US2011/048124; Korean Intellectual Property Office, dated Apr. 9, 2012.

(Continued)

*Primary Examiner* — Katy M Ebner
(74) *Attorney, Agent, or Firm* — Locke Lord LLP

(57) ABSTRACT

An electric utility vehicle with a frame, at least one drive motor mounted to the frame through a suspension assembly, a wheel mounted to the motor, and a steering assembly for steering the vehicle, wherein the steering assembly may be interchangeably reconfigured into a side driver configuration and a center driver configuration. The drive motor may be mounted at any one of four wheel positions. The suspension assembly may be interchangeably reconfigured as an independent A-arm suspension assembly and a trailing arm suspension assembly. The vehicle may include a controller coupled to the motor for independently supplying electrical power to each of two drive motors, such that during a turn an outside motor is supplied with more power than an inside motor. The controller may supply electrical power the drive motor according to a selected acceleration profile of at least two acceleration profiles.

20 Claims, 2 Drawing Sheets

(56) References Cited

U.S. PATENT DOCUMENTS

| | | | |
|---|---|---|---|
| 2,822,969 A | | 2/1958 | Cooper |
| 2,839,312 A | * | 6/1958 | Barenyi et al. ............... 280/775 |
| 3,163,250 A | | 12/1964 | Gibson |
| 3,843,202 A | | 10/1974 | Lacerte |
| 4,105,084 A | | 8/1978 | Baak |
| 4,842,326 A | | 6/1989 | Divito |
| 5,004,061 A | | 4/1991 | Andruet |
| 5,058,016 A | * | 10/1991 | Davidovitch ................. 701/22 |
| 5,087,229 A | | 2/1992 | Hewko et al. |
| 5,203,601 A | | 4/1993 | Guillot |
| 5,218,920 A | * | 6/1993 | Kobayashi ............... 114/144 R |
| 5,272,938 A | | 12/1993 | Hsu et al. |
| D350,505 S | | 9/1994 | Yang |
| 5,402,046 A | | 3/1995 | Jeanneret |
| 5,481,460 A | | 1/1996 | Masaki et al. |
| D390,163 S | | 2/1998 | Tomforde et al. |
| D391,899 S | | 3/1998 | Chibuka et al. |
| 5,727,642 A | | 3/1998 | Abbott |
| D404,690 S | | 1/1999 | Garand et al. |
| 5,894,902 A | | 4/1999 | Cho |
| 5,923,096 A | * | 7/1999 | Manak ........................ 307/10.1 |
| 5,943,979 A | * | 8/1999 | Hattori ......................... 114/362 |
| 6,065,798 A | | 5/2000 | Sankrithi |
| 6,089,353 A | * | 7/2000 | Bartels et al. ................ 187/224 |
| 6,100,615 A | | 8/2000 | Birkestrand |
| D432,460 S | | 10/2000 | Huang |
| 6,145,913 A | | 11/2000 | Odagaki |
| 6,199,651 B1 | | 3/2001 | Gay |
| D441,320 S | | 5/2001 | Kehr |
| D442,517 S | | 5/2001 | Hoogenraad |
| 6,390,216 B1 | * | 5/2002 | Sueshige et al. ........... 180/65.51 |
| 6,397,961 B1 | | 6/2002 | Sutton |
| 6,446,747 B1 | * | 9/2002 | Muller et al. ................. 180/334 |
| 6,494,278 B1 | | 12/2002 | Weisz |
| 6,494,531 B1 | | 12/2002 | Kim |
| 6,547,304 B1 | | 4/2003 | Conner et al. |
| 6,564,802 B1 | | 5/2003 | Kraeft, Sr. |
| 6,776,445 B1 | | 8/2004 | Conner et al. |
| 6,857,498 B2 | * | 2/2005 | Vitale et al. ................... 180/326 |
| 6,885,160 B2 | * | 4/2005 | Takeuchi ...................... 318/139 |
| 6,991,060 B2 | * | 1/2006 | Chernoff et al. .............. 180/326 |
| RE39,101 E | | 5/2006 | Miyahara et al. |
| 7,086,491 B2 | * | 8/2006 | Matte .......................... 180/65.1 |
| 7,100,722 B2 | | 9/2006 | Bowen |
| 7,163,072 B2 | | 1/2007 | Yamaguchi |
| 7,192,040 B2 | | 3/2007 | Xie |
| 7,195,096 B1 | | 3/2007 | Mawhinney |
| 7,243,746 B1 | * | 7/2007 | Vasant .......................... 180/6.5 |
| 7,258,395 B2 | | 8/2007 | Bataille et al. |
| 7,373,315 B2 | | 5/2008 | Chernoff et al. |
| 2003/0085064 A1 | | 5/2003 | Turner |
| 2003/0085065 A1 | | 5/2003 | Weisz |
| 2003/0230443 A1 | | 12/2003 | Cramer et al. |
| 2004/0112656 A1 | | 6/2004 | Bowen |
| 2005/0279541 A1 | | 12/2005 | Peters |
| 2008/0017426 A1 | | 1/2008 | Walters et al. |

OTHER PUBLICATIONS

Tak, H. Y; Written Opinion for International Patent Application No. PCT/US2011/048124; Korean Intellectual Property Office, dated Apr. 9, 2012.

* cited by examiner

ELECTRIC UTILITY VEHICLE

CROSS REFERENCE TO RELATED APPLICATIONS

This application is a continuation-in-part of, and claims priority benefit of, U.S. application Ser. No. 11/124,967, filed May 9, 2005, entitled "Electric Golf Cart and Utility Cart", which claims priority benefit of U.S. Provisional Application Ser. No. 60/569,387, filed on May 7, 2004, entitled "Electric Golf Cart and Utility Cart". Both of these applications are incorporated herein by specific reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to utility vehicles; and more specifically relate to reconfigurable electric utility vehicles.

2. Description of the Related Art

U.S. Pat. No. 4,105,084 teaches a "powered transport unit which may be removably adapted to a standard golf bag cart or the like of the type having a pair of oppositely disposed wheels. A battery and a motor sit at opposite ends of a pivotally mounted power frame positioned between the wheels of the cart. A powered drive wheel is aligned with the wheels of the cart. The relative positions of the battery, motor and pivotal mounting allows the unit to achieve a zero resultant force on the cart's handle at a chosen motor output. A power control unit adaptable to the handle of the cart allows the user to activate and regulate the action of the drive wheel."

U.S. Pat. No. 4,842,326 teaches "[m]odular motor vehicles are provided with a plurality of independently operable functionally different automobile and truck type core vehicles and a plurality of interchangeable functionally different body and chassis modules attachable to the core vehicles. The core vehicles utilize standardized first engagement means including frames and adapter plate elements connected to or "unitized" into the core vehicles. Said first engagement means of the cores have positioning elements and alternating connecting elements at standardized predetermined spacing and location defining a structurally rigid bed for the modules. The modules incorporate a second engagement means, located and spaced to compliment said first engagement means, making it possible to easily align, connect and disconnect the modules with respect to the core vehicles. The modules incorporate a third engagement means to align and connect the multiple-piece modules together. Second and third engagement elements can be discrete entities attached to the modules or "unitized" into the modules themselves. The core vehicles include front, mid and rear engine configurations."

U.S. Pat. No. 5,004,061 teaches a "motor vehicle includes two wheel and axle sets, one in front and one in the rear, at least one of which is driven and at least one of which steers. The power to the vehicle is assured by an on-board source of electrical energy. Each wheel of each driven set is equipped with an electrical back-geared motor assembly supplied by the source of electrical energy, the motor assembly being connected to a chassis of the vehicle by two suspension triangles articulated on one side on the motor assembly and on another side on the chassis, the output shaft of the assembly including the axle of the corresponding wheel."

U.S. Pat. No. 5,087,229 teaches a "motor wheel apparatus having an integral reduction planetary gearset is steerable and adapted for use in a conventional independently sprung automotive suspension. The motor, gearset and wheel elements are mounted on a single steerable support member to minimize the tolerance stack up and to enable independent servicing of the motor and gearset elements. The output element of the gearset is supported solely by virtue of the gear meshes and a splined connection to the wheel, thereby permitting the output element to self-align with the wheel and isolating the wheel forces from the motor and gearset elements."

U.S. Pat. No. 5,272,938 teaches a "flat rim type motor drive mechanism is disclosed for driving a bicycle which includes a motor having a rotor made of a multi-layer mylar film rotor coil and fastened inside a housing coupled to the spokes of either wheel of a bicycle, an epicyclic gearing fastened inside the housing and driven by the motor to rotate the wheel of the bicycle via the housing and the spokes, and a swivel type speed governor handle controlled to regulate the voltage and current from a DC power supply to the motor."

U.S. Pat. No. 5,402,046 teaches a "vehicle drive system [that] has an asynchronous motor mechanically coupled to a wheel of the vehicle, a rechargeable accumulator, a first converter interposed between the rechargeable accumulator and the motor and arranged so as to regulate the electric power supplied to the motor and a generator driven by an internal combustion engine, as well as a control circuit. To make it possible to recharge the accumulator under optimum conditions, the system also has a second converter arranged so as to regulate the power supplied by the generator to the accumulator and to the first converter."

U.S. Pat. No. 5,481,460 teaches a "controller for an electric vehicle in which right and left drive wheels are respectively driven by drive motors which are individually provided. The controller for an electric vehicle comprises motors for driving right and left wheels, means for detecting rotating speeds or rotation torques of the wheels, and a facility for taking a rotation deviation between output signals from the detection means close to zero. As a result, the vehicle is always operated in safety."

U.S. Pat. No. 5,727,642 teaches a "golf cart for persons who are obliged to traverse a golf course in a cart which includes a golf bag carrier mechanism, steering assembly, and an adjustable seat to enable the person to swing a golf club without interference with the aforementioned components. The seat may be rotated in either direction from the traversing axis of the cart to enable the person to face the golf ball to be struck. The steering mechanism and the golf bag carrier are capable of being moved to a position free from the swing pattern of the seated person."

U.S. Pat. No. 6,065,798 teaches a "new class of motor vehicle means for carrying passengers and cargo. This new class of motor vehicle provides, in an inventive way, a combination of the passenger-carrying advantages offered by van or minivan type vehicles and the cargo-carrying advantages offered by pickup truck type vehicles."

U.S. Pat. No. 6,100,615 teaches a "motorized wheel hub assembly includes a sealed motor section having first and second coaxial shafts extending from the motor section, the second shaft being a rotary shaft and a gear reduction section adjacent to the motor section, the gear reduction section including a pinion at the end of the rotary shaft, a plurality of planet gears rotatably mounted to the housing in meshing engagement with the pinion and a third shaft connected to the motor housing, all of the shafts being separate but coaxial. A hub having an interior surface closely surrounds the motor and gear reduction sections and is rotatably coupled to the first and third shafts. A ring gear formed in the interior surface of the hub is in meshing engagement with the planet gears so that when the second shaft rotates at a selected speed, the hub rotates relative to the first and third shafts at a lesser speed. Preferably, the hub is partially filled with oil to conduct heat from the motor section to the outside."

U.S. Pat. No. 6,145,913 teaches a "seat attachment structure for a motor vehicle having first rear seats juxtaposed transversely of the motor vehicle includes a first holder for holding the first rear seat in a position close to the other first rear seat and a second holder for holding the first rear seat in side position close to a side door which is spaced from the first rear seat. The seat attachment structure is versatile in use as it allows the first rear sear to be moved transversely of the motor vehicle depending on the type of a seat layout to be employed in the motor vehicle."

U.S. Pat. No. 6,390,216 teaches a "power unit for use with a motorized cart. Two wheels are rotatably mounted to opposite ends of an interconnecting member. In one embodiment, at least one driving motor is housed in at least one of these two wheels. In another embodiment, a driving motor is housed in one of the two wheels, and batteries are housed in the other wheel. In a further embodiment, two opposite platforms are mounted over the interconnecting member in a spaced relation to each other. In yet another embodiment, a battery-accommodating portion is disposed between the two platforms. Batteries are housed in the battery-accommodating portion. Where the cart is a golf cart, the motor and the batteries are concealed from view in every embodiment of the invention. This is favorable from an aesthetical point of view. Furthermore, the space in at least one wheel can be effectively utilized. Where the frame of the golf cart is foldable, it is easy to store and transport the cart."

U.S. Pat. No. 6,397,961 teaches an "individualized golf cart comprises a golf cart body supported off the ground a pair of front steering wheels and a pair of rear driving wheels. The cart further includes a mounting structure for retaining a golf bag on the cart. A steering system is operatively coupled to the steering wheels to steer the golf cart. A propulsion system including a motor and power supply are operatively coupled to the wheels to drive the golf cart. A brake system is operatively coupled to the wheels to slow and/or stop the golf cart. A platform is attached to the cart body adjacent the driving wheels and extends rearwardly therefrom to support a person in an upright position behind the driving wheels. The platform includes a safety enclosure defining an operating station which includes access to controls for the steering system, propulsion system and brake system. The platform provides a short step to the ground, the golf bag being within reach of the golfer upon exiting the operating station."

U.S. Pat. No. 6,547,304 teaches a "cover for a golf cart is removably affixed to an attached frame and existing roof support members of the roof of the cart where the attached frame comprises an upper frame, door posts and at least one removable door. The cover thus provides protection to golfers in a golfer compartment during inclement weather and also provides for convenient access to and from golfer compartment whether through door opening when opened or through the door frame when the door is in a closed position with the cover portion removed therefrom. The door may be stored in at least two positions upon the frame or may be removed from the frame and stored separately."

The inventions disclosed and taught herein are directed to an improved electric utility vehicle.

BRIEF SUMMARY OF THE INVENTION

An electric utility vehicle with a frame, at least one drive motor mounted to the frame through a suspension assembly, a wheel mounted to the motor, and a steering assembly for steering the vehicle, wherein the steering assembly may be interchangeably reconfigured into a side driver configuration and a center driver configuration. The drive motor may be mounted at any one of four wheel positions. The suspension assembly may be interchangeably reconfigured as an independent A-arm suspension assembly and a trailing arm suspension assembly. The vehicle may include a controller coupled to the motor for independently supplying electrical power to each of two drive motors, such that during a turn an outside motor is supplied with more power than an inside motor. The controller may supply electrical power the drive motor according to a selected acceleration profile of at least two acceleration profiles. Thus, the same vehicle of the present invention may be reconfigured to suit any of a plurality of missions or uses.

DETAILED DESCRIPTION OF THE INVENTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top,"

"bottom," "left," "right," "upper," "lower," "down," "up," "side," and the like are used in the written description for clarity in specific reference to the Figures and are not intended to limit the scope of the invention or the appended claims.

Applicants have created an electric utility vehicle with a frame, at least one drive motor mounted to the frame through a suspension assembly, a wheel mounted to the motor, and a steering assembly for steering the vehicle, wherein the steering assembly may be interchangeably reconfigured into a side driver configuration and a center driver configuration. The drive motor may be mounted at any one of four wheel positions. The suspension assembly may be interchangeably reconfigured as an independent A-arm suspension assembly and a trailing arm suspension assembly. The vehicle may include a controller coupled to the motor for independently supplying electrical power to each of two drive motors, such that during a turn an outside motor is supplied with more power than an inside motor. The controller may supply electrical power the drive motor according to a selected acceleration profile of at least two acceleration profiles.

Figure 1:
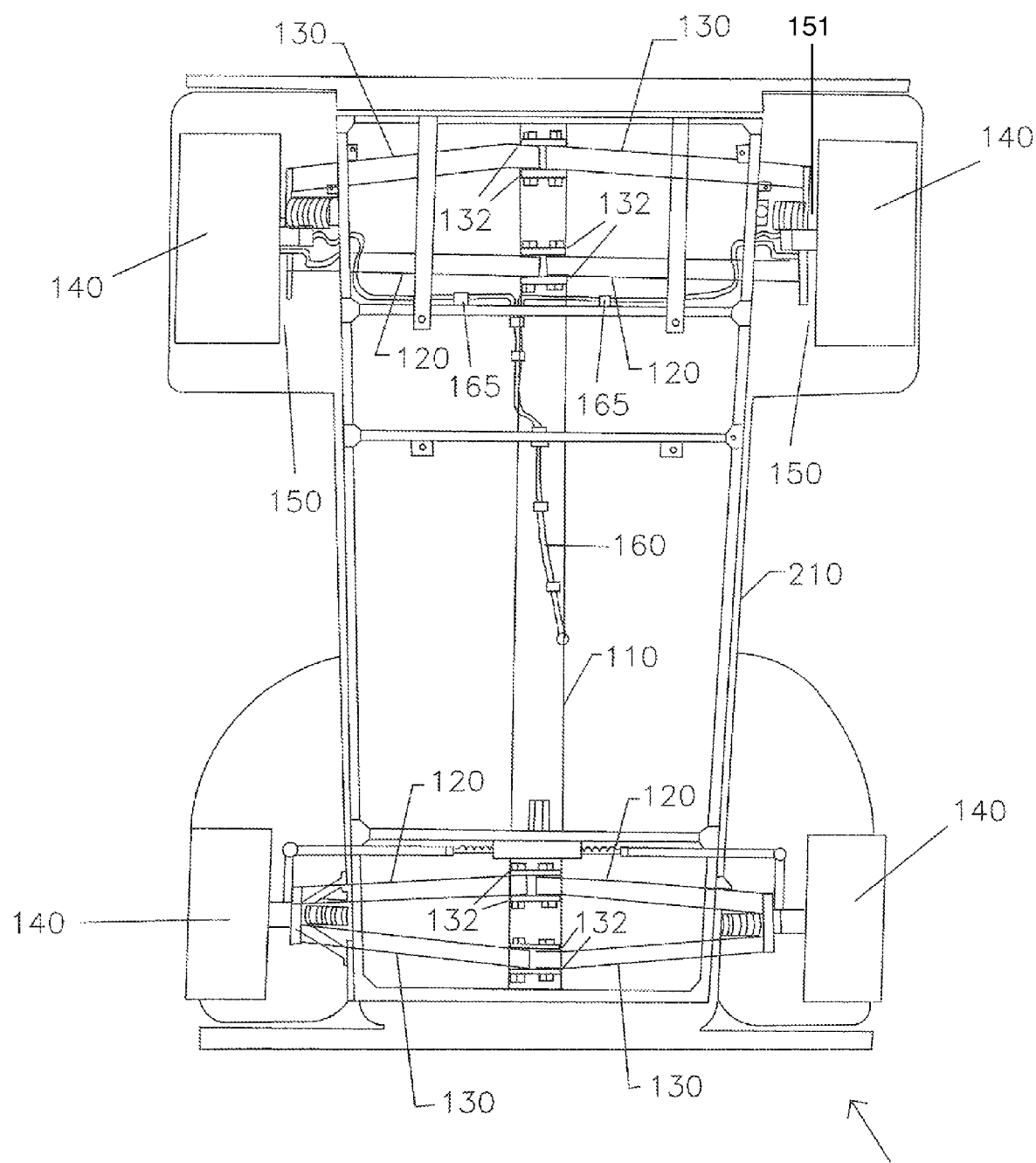
FIG. 1 illustrates a bottom plan view of a particular embodiment of an electric utility vehicle utilizing certain aspects of the present inventions.

FIG. 1 is an illustration of a four-wheel electric wheel-driven vehicle 100 for transportation of people and/or goods, as well as for recreational uses. In one embodiment, the electric vehicle 100 has a central longitudinal frame (or spine) 110 and a number of wheel positions 120 along the frame 110. Alternatively, the frame 110 may comprise more traditional substantially rectangular chassis with several transverse frame support members coupled thereto.

In any case, the frame 110 preferably includes two wheel positions along each side, with two opposing wheel positions near a front portion and two opposing wheel positions near a rear portion, for a total of four wheel positions 120. Although a four-wheel vehicle is described herein, a person having ordinary skill in the art will recognize that the principles and teachings of the present invention may be equally applicable to vehicles with fewer or more than four-wheels.

Attached to each wheel position 120 is preferably a suspension assembly 130, secured to the frame by brackets 132. In some embodiments, the suspension assemblies 130 may comprise independently suspended "A" arm coupled to one or more gas canister shock absorbers, although other types of suspension systems may certainly be used. For example, double independently suspended "A" arm coupled to one or more gas canister shock absorbers may be used. In other embodiments, the suspension assemblies 130 may comprise a trailing arm suspension. In any case, the suspension assemblies 130 are preferably interchangeable and reconfigurable, such each suspension assembly 130 may be interchangeably reconfigured as an independent A-arm suspension assembly and/or a trailing arm suspension assembly. Thus, the vehicle 100 may include trailing arm suspension assemblies in the rear portion and independent double A-arm suspension assemblies in the front portion, or any combination thereof. In any case, the suspension assemblies 130 each preferably rotatably secure a wheel 140 to the spine 110 at each of the wheel positions 120. Thus, the front and rear wheels 140 are preferably articulated and independently suspended from the frame 110.

One or more of the wheels 140 may be interchangeably reconfigured as drive wheels. For example, the electric vehicle 100 may have a hub motor 150 mounted in one or more front wheels and/or rear wheels, depending on the amount of power desired for the vehicle 100. The hub motors 150 may be any suitable electric hub motors, but are preferably geared DC wound induction, brushless motors.

Because any of the wheels 140 may be interchangeably reconfigured as drive wheels, the vehicle 100 preferably includes a wiring harness 160 with wheel connectors 165 adjacent to each wheel position 120. The harness 160 preferably carries current to any and/or all of the motors 150 as well as feedback signals from the motors 150.

Figure 2:
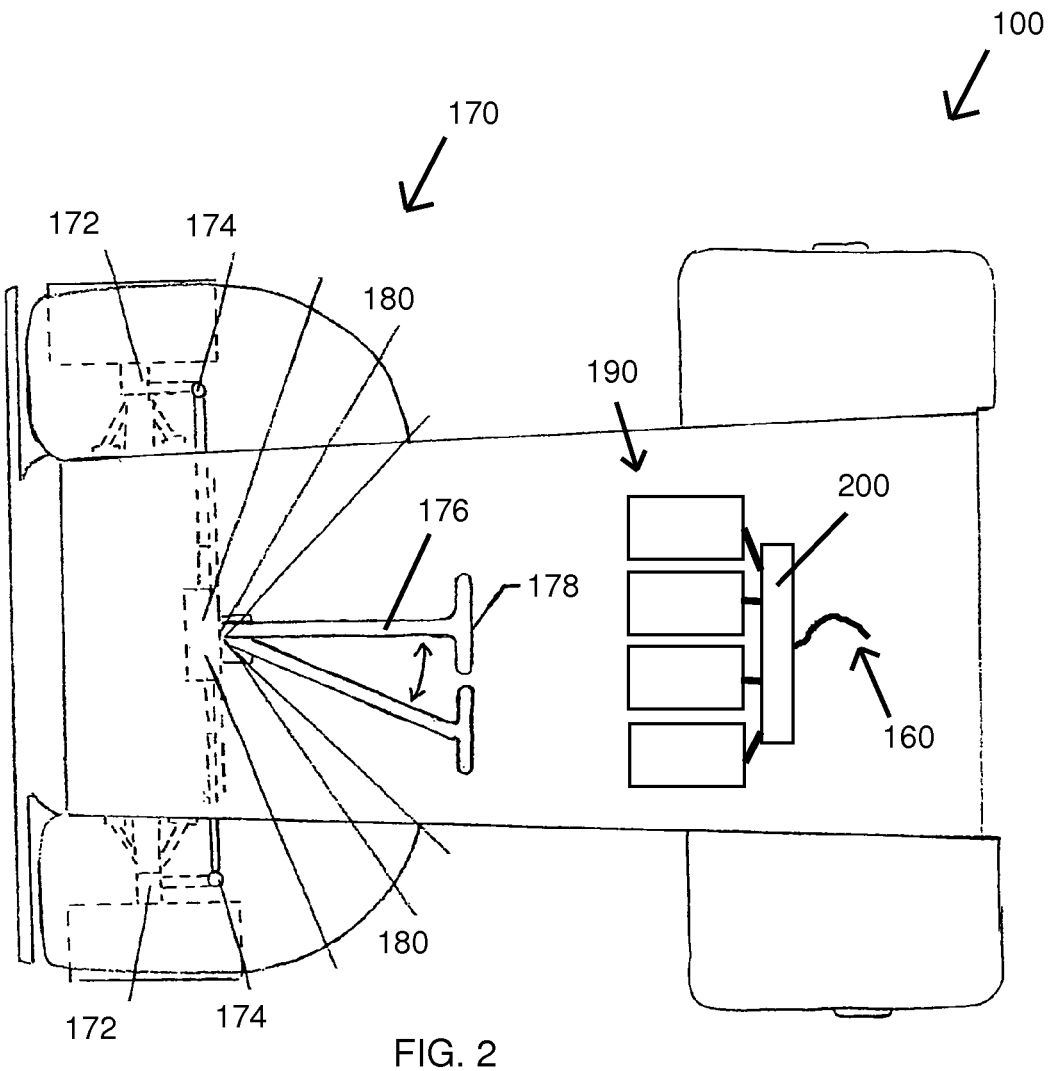
FIG. 2 illustrates a partial top plan view of a particular embodiment of an electric utility vehicle utilizing certain aspects of the present inventions.

Referring also to FIG. 2, a steering assembly 170 is preferably connected to the front wheels and allows the vehicle to be steered. The steering assembly 170 may comprise, for example, a pivotal spindle 172 coupled to the suspension assemblies 130 in the front portion and a transverse rack and pinion steering member 174 coupled to the pivotal spindles 172. A longitudinal pivotal steering column 176 may be pivotally coupled to the rack and pinion steering member 174 on one end and a steering wheel 178 on the other end, sloping upward. In this case, the longitudinal steering column 176 may be aligned directly above a center coupling 180 on the rack and pinion steering member 174 for a center driver position. Due to being pivotally coupled to the rack and pinion steering member 174, the longitudinal steering column 176 may be aligned about ten degrees to the left, or right, of the center coupling 180 on the rack and pinion steering member 174 for a left, or right, side driver position. In this manner, the steering assembly 170 may be interchangeably reconfigured into a left, or right, side driver configuration and a center driver configuration.

Current is supplied to the one or more motors 150 by one or more batteries 190. Examples of suitable batteries may include 24/36/48 volt lead-acid, nickel-cadmium, or nickel-metal hydride batteries. The current from the batteries 190 may be controlled through, for example, a controller 200. The controller 200 may be part of a throttle assembly and may independently supply electrical power, or current, to each of the drive motors 150. Electric current to each hub motor is preferably regulated by the throttle assembly. Thus, the throttle assembly may also include, for example, a hand or foot actuated potentiometer ergonomically located on the vehicle 100 for rider comfort. The current to the hub motors may be interrupted using, for example, a keyed switch or other suitable mechanisms.

The throttle assembly may also be interchangeably reconfigured into a left, or right, side driver configuration and a center driver configuration. The throttle assembly may also interact with the steering assembly 170, such that the controller 200 may monitor the steering assembly 170 and independently supplying electrical power to each of two drive motors 150 For example, the controller 200, or steering assembly 170 more directly, may supply more power, or current, to an outside motor than an inside motor during a turn. This functionality may replicate, to some degree, the functionality of a mechanical differential in a more traditional vehicle.

In this regard, the throttle assembly may monitor the steering assembly 170. For example, the steering assembly 170 may include an analog or digital potentiometer to determine a orientation of the steering wheel 178, or other inputs provided by an operator, or user. In this manner, the steering assembly 170, throttle assembly, and/or the controller 200 may decide or determine that the user is turning left, and in response, may slow a left side drive wheel and/or speed up a right side drive wheel.

A hybrid recharging system may be used to maintain the batteries 190 in a substantially charged state. The hybrid recharging system may include, for example, 110 or 220 volt transformer type chargers and photovoltaic array battery chargers. The hybrid recharging system may also include also include a regenerative braking system that converts the drive motors 150 into generators, when the operator presses a brake pedal. Such a hybrid recharging system helps expedite recharging of the batteries in a more efficient and cost effective manner compared to existing electric vehicle battery recharging systems. The controller 200 may control one or more, or even all, aspects of the recharging system. Battery power status is continuously indicated to the rider by, for example, an appropriate display gauge such as a liquid crystal display (LCD) gauge.

The electric vehicle 100 may also include a vehicle body 210 constructed of one of the well-known rigid structural polymers such as a molded fiberglass reinforced polymer. Of course, other materials, such as, for example, polycarbonates, polyesters and structural composites, may also be used. The vehicle body 210 may have a number of sections, including a center hood section, a rider seat section, a battery compartment and storage area section, and a pair of rear fenders with a storage bed section. The sections may be in the form of releasably attached panels that are swapped in and out in order to reconfigure the vehicle for any one of several specific uses. Any suitable type of seat may be mounted in the rider seat section, such as a polyvinyl molded foam seat. In some cases, the seat may include a safety belt and may be swiveled for ease of entry and egress. If doors and corresponding hinges are on the vehicle, they may be mounted on the vehicle body 210 in the usual manner. For example, the doors may be coupled to the battery compartment and storage area section. A golf bag restraint and support system may be coupled to the rear storage bed section.

In some embodiments, the vehicle body 210 also comprises a firewall and dashboard section and a roof section. Additionally, two seats instead of one may be coupled to the rider and passenger seat section, and/or two golf bag restraint and support systems may be coupled to the rear fender storage bed section. In some embodiments, the vehicle body further comprises a center tool box configuration section and a rear tool box configuration in the storage bed section. In some embodiments, the vehicle body further comprises a center molded golf bag restraint and storage section.

A rider, operator, or user operates the vehicle 100 while seated in the vehicle body 210. The rider controls the travel speed of the vehicle through application of the throttle assembly to control the controller 200 and thereby control the drive motor(s) 150. In addition the to deceleration provided by the regenerative braking system, the rider may slow and stop the vehicle 100 via a mechanical braking system by applying direct, unassisted force to a pedal assembly of the braking system. The force may be transmitted from the pedal assembly through a transmission cable to a caliper friction disc located externally on the wheel to thereby slow, stop, or lock the wheel. The vehicle 100 is steered by the rider via the steering assembly 170. The drive direction of the one or more hub motors 150 may be reversed so as to drive the vehicle 100 in the opposite direction. Reversing the hub motors 150 may be controlled by a reverse polarity switch, operated by the user, or the controller 200. An audible alarm may be used to warn bystanders when the vehicle 100 is traveling in reverse.

Figures 3A, 3B:
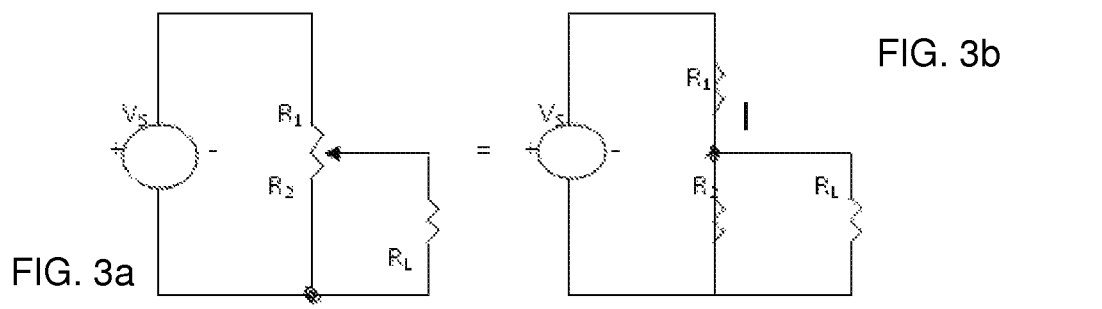
FIGS. 3a and 3b illustrate simplified schematics of a portion of a throttle assembly, or motor control circuit, slaved to steering inputs utilizing certain aspects of the present inventions.

FIGS. 3a and 3b provide a further explanation of how the vehicle 100 allows the rear wheels to turn at different radiuses to maintain proper lateral force slip angle, or weight transfer. The outside wheel always runs at higher loading than the inside wheel, and therefore higher slip angles, which necessitates greater wheel load. The vehicle 100 has the ability to travel in a straight line as well as negotiate turning with electronic control from the controller 200 with no mechanical assistance. This negates any necessity for additional drive train mechanical devices (differentials or transaxles) to impart or influence wheel "slip" or "lock" to facilitate turning. The vehicle's 200 pure electric drive system operates with independent current control, which can be correlated to wheel speed to each drive wheel 140 depending on steering wheel turn input digressed left or right from centered steering, or neutral, through circuitry, such as a computer logic gate integrated circuit amplified signal rheostat, installed on the vehicle steering column. Depending on the degree of turn 0°-179° right to 359°-180° left, a double potentiometer with sliding contacts that forms an adjustable voltage divider acting as a potential divider or rheostat, or analog potentiometer, is used to adjust the level of analog signals transmitted from the batteries 190 to each motor 150 (left or right side) depending on the radial location of the steering wheel 178. Wheel speed affecting rear wheel load and the subsequent turning radius of each rear wheel may be a direct correlation to current input levels from the potential divider. An advantage of the potential divider is that dividers are able to vary the output voltage from maximum to ground, or zero volts, as the wiper moves from one end of the potentiometer to the other.

A resistive potentiometer, comprising an arc of a circle of a resistive material and a sliding contact (wiper) travelling over that arc that is energized electrically, may be utilized. The resistive potentiometer may be installed encircling the steering column 176 and transmits increasing or decreasing amounts of applied current directly to each drive motor 150, or the controller 200, depending on the steering wheel 178 radial location from 360°-179° right and 359° to 180° left. Rotary potentiometers typically have approximately 270° of effective electrical conductive rotation which allows a neutral zone with little or no electrical resistance in operation from 360° to 25°, 154° to 179° right, 180° to 205°, 324° to 359° left through a full 360° rotation.

In one embodiment, in executing a vehicle turn with the steering wheel turned from neutral (360°) to the right towards 179°, the voltage from a 48 v power source through the potentiometer decreases from 48V to zero V. Due to decreasing resistance from the resistive potentiometer directly decreasing the input electrical voltage, or current, to a right turn input to the controller 200, which is connected to the right side hub drive motor 150, the decreased current input to the motor 150 decreases the speed (RPM) of the right side motor 150 and attached drive wheel 140. For example, the right turn input to the controller 200 may be a voltage input across R1. The inverse is true simultaneously on the left region (half circle) of the potentiometer which increases in resistance from the resistive potentiometer Zero V to 48V, increasing the input voltage, or current, to a left turn input to the controller 200, increasing the speed (RPM) of the left side drive motor 150 and attached drive wheel 140. Similarly, the left turn input to the controller 200 may be a voltage input across R2. The inverse holds true when the steering wheel turns from right to left. Thus, we are capable of completely eliminating any mechanical sliding differential assist to reduce drive wheel loading and elimination of scrubbing of opposite rear drive wheels by controlling wheel speed through electrical signals. This more precise, technologically advanced, and previously undeveloped vehicle wheel loading and weight transfer system improves vehicle turning characteristics in even the most excessive (tight radius) turns in either direction.

As discussed above, the vehicle 100 may include a unique and significant development in a pure electric vehicle drive system. The controller 200 of the vehicle 100 may control the drive motors 150 using any one of preconfigured acceleration and/or deceleration curves, or profiles, that may be changed while operating the vehicle 100. The acceleration and/or deceleration curves, or profiles, of the vehicle 100 can be changed immediately while running through a switch or an analog or digital potentiometer input to the controller 100 mounted on the vehicle's 100 gauge panel, or dashboard, and/or any location readily accessible to the operator. In one embodiment, the acceleration and/or deceleration profiles available for selection are designated as "Mild", "Steep", and "Freedom". These profiles are fixed within a specified operating range. For example, the freedom acceleration profile may allow the vehicle to accelerate 0-15 mph in 1.0 sec. with 10 ft. travel distance. The steep acceleration profile may allow the vehicle to accelerate 0-15 mph in 1.5 sec with 150 ft. travel distance. The mild acceleration profile may allow the vehicle to accelerate 0-15 mph in 3.0 sec. with 300 ft. travel distance.

The acceleration and/or deceleration profiles may be selected according to the desired performance, as discussed above, or may be selected according to the load the vehicle 100 is carrying. The acceleration and/or deceleration profiles may be selected manually, or automatically by the controller 200. For example, if the controller 200 senses that the vehicle is heavily loaded, such as by monitoring speed versus power applied to the motors 150, the controller 200 may select a higher performance acceleration profile and/or a stronger deceleration profile to compensate.

The controller 200 may also monitor the state of charge of the batteries 190, and display that information on the LCD gauge. Further, the controller 200 may provide an indication of range, with the currently selected acceleration and/or deceleration profiles. The user may then select a different profile to extend the range of the vehicle 100.

The motors 150 themselves are a significant advance over existing solutions, which use brushed motors driving external geared transmission differentials, as commonly found on traditional golf carts. Because the motors 150 are preferably brushless, the motors 150 are able to overcome initial startup with just a few milliamps of electricity exciting the Hall Effect Sensors in the motor and still be able to run at full power input and obtain top speed according to the power input from the controller 200 and gear ratio of the internal gear set. Additionally, because the brushless motors 150 are adapted with gears, unlike existing gearless solutions, power transfer to the drive wheels 140 may be accomplished by the internally geared hub motors 150 themselves turning the drive wheels. Each gear set enables the changing of three ratios by simply changing the pinion gear in the gear box, indicated generally at 151. This makes it possible to have a top speed range from, for example, 6 to 60 mph, without changing the entire gear set. Ramp up speed (i.e., how fast to initiate and excite the Hall Effect Sensors) can be controlled and adjusted through the controller 200. Such ramp up speed can be rheostatically changed on the fly while the motors are running.

As discussed above, the present invention is able to change its ramp up speed from initial start to full speed by changing power input through the controller 200 to the motor 150 and/or changing internal drive gear ratios. Thus, the present invention does not need any additional drive mechanisms, such as axles, chains, belts, etc., to transfer electrical motor power to the drive wheels (although it may accommodate such drive mechanisms, depending on the particular implementation). This, of course, enables easy configuration/reconfiguration between one wheel drive (with any of the wheels being configurable/reconfigurable as the drive wheel), two wheel drive (with any of the wheels being configurable/reconfigurable as the drive wheels), three wheel drive (with any of the wheels being configurable/reconfigurable as the drive wheels), and/or four wheel drive. Applicant is not aware of any commercially available vehicle that uses a geared brushless hub/wheel drive system as the primary source of drive power.

Other and further embodiments utilizing one or more aspects of the inventions described above can be devised without departing from the spirit of Applicant's invention. For example, the vehicle 100 may use the same or different suspension assemblies 130 at each of the wheel positions 120. Further, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. An electric utility vehicle comprising:
    a frame;
    a plurality of drive motors mounted to the frame through a suspension assembly;
    a wheel mounted to each one of the plurality of drive motors, each wheel being directly driven by a respective one of the plurality of drive motors; and
    a mechanical steering assembly for steering the vehicle, the mechanical steering assembly including a steering wheel mounted on a steering column connected to the frame;
    wherein the mechanical steering assembly may be interchangeably reconfigured into a side driver configuration and a center driver configuration; and
    wherein at least one of the plurality of drive motors is a brushless direct current battery-operated internally-geared hub motor mounted to the frame through the suspension assembly and configured to selectively change drive ratios, and wherein final drive ratios are selected by changing a mechanical pinion gear, each one of the plurality of drive motors being interchangeable with another one of the plurality of drive motors and detachable to allow the electric utility vehicle to be reconfigured as a one-wheel drive vehicle, two-wheel drive vehicle, three-wheel drive vehicle, or four-wheel drive vehicle.

2. The vehicle of claim 1, wherein the mechanical steering assembly may be interchangeably reconfigured into a left side driver configuration and a right side driver configuration.

3. The vehicle of claim 1, wherein the mechanical steering assembly includes circuitry for independently supplying required electrical power to each of two drive motors, such that during a turn an outside motor is supplied with more power than an inside motor, resulting in a power differential that affects tire slippage sideways when following a path around a curve.

4. The vehicle of claim 1, further including an electrical wiring harness supplying electrical current for wheel speed braking and steering from an electronic controller to connectors located near each of four wheel positions along the frame, such that the drive motor may be mounted at any one of the wheel positions.

5. The vehicle of claim 1, wherein the suspension assembly may be interchangeably reconfigured as either an independent A-arm suspension assembly and or a trailing arm suspension assembly designed to have the capability to adjust and control bump/roll steer.

6. The vehicle of claim 1, further including a controller coupled to the motor for independently supplying electrical power to each of two drive motors as required, such that during a turn an outside motor is supplied with more power than an inside motor in order to turn faster.

7. The vehicle of claim 1, further including a controller coupled to the motor for supplying electrical power input to the drive motor according to a selected electronic acceleration profile of at least two preconfigured acceleration profiles within the torque range predetermined by the gearing of the internally geared hub motor.

8. The vehicle of claim 7, wherein the acceleration profiles are preconfigured in the controller and wherein a user may select the appropriate acceleration profile while the vehicle is in motion.

9. The vehicle of claim 1, further including a controller coupled to the motor for slowing the drive motor according to a selected deceleration profile of at least two deceleration profiles within a torque range predetermined by a gearing of the internally geared hub motor.

10. The vehicle of claim 9, wherein the selected deceleration profiles are preconfigured in the controller and wherein a user may select the appropriate deceleration profile while the vehicle is in motion.

11. An electric utility vehicle comprising:
a frame;
a plurality of drive motors mounted to the frame through a suspension assembly;
a wheel mounted to each one of the plurality of drive motors, each wheel being directly driven by a respective one of the plurality of drive motors;
a mechanical steering assembly for steering the vehicle, the mechanical steering assembly including a steering wheel mounted on a steering column connected to the frame, wherein the mechanical steering assembly may be interchangeably reconfigured into a side driver configuration and a center driver configuration; and
a controller coupled to the motor for supplying electrical power the drive motor according to a selected acceleration profile and controlling regenerative breaking of the drive motor according to a selected deceleration profile;
wherein at least one of the plurality of drive motors is a brushless battery-operated internally-geared hub motor mounted to the frame through the suspension assembly and configured to selectively change drive ratios, and wherein final drive ratios are selected by changing a mechanical pinion gear, each one of the plurality of drive motors being interchangeable with another one of the plurality of drive motors and detachable to allow the electric utility vehicle to be reconfigured as a one-wheel drive vehicle, two-wheel drive vehicle, three-wheel drive vehicle, or four-wheel drive vehicle.

12. The vehicle of claim 11, wherein the mechanical steering assembly may be interchangeably reconfigured into a left side driver configuration and a right side driver configuration.

13. The vehicle of claim 11, wherein the mechanical steering assembly includes circuitry for independently supplying required electrical power to each of two drive motors, such that during a turn an outside motor is supplied with more power than an inside motor, resulting in a power differential that affects tire slippage sideways when following a path around a curve.

14. The vehicle of claim 11, further including an electrical wiring harness supplying electrical current for wheel speed braking and steering from an electronic controller to connectors located near each of four wheel positions along the frame, such that the drive motor may be mounted at any one of the wheel positions.

15. The vehicle of claim 11, wherein the suspension assembly may be interchangeably reconfigured as either an independent double A-arm suspension assembly and a trailing arm suspension assembly designed to have the capability to adjust and control bump/roll steer.

16. The vehicle of claim 11, wherein the controller controls the supply of electrical power to each of two drive motors as required, such that during a turn an outside motor is supplied with more power than an inside motor in order to turn faster.

17. The vehicle of claim 11, wherein the selected acceleration profile is selected from at least two preconfigured acceleration profiles.

18. The vehicle of claim 17, wherein a user may select the selected acceleration profile while the vehicle is in motion.

19. The vehicle of claim 11, wherein the selected deceleration profile is selected from at least two preconfigured deceleration profiles within a torque range predetermined by a gearing of the internally geared hub motor.

20. The vehicle of claim 19, wherein a uses may select an appropriate deceleration profile while the vehicle is in motion.

* * * * *